E. F. CRAWFORD.
Seeder and Cultivator.
No. 78,066.
Patented May 19, 1868.
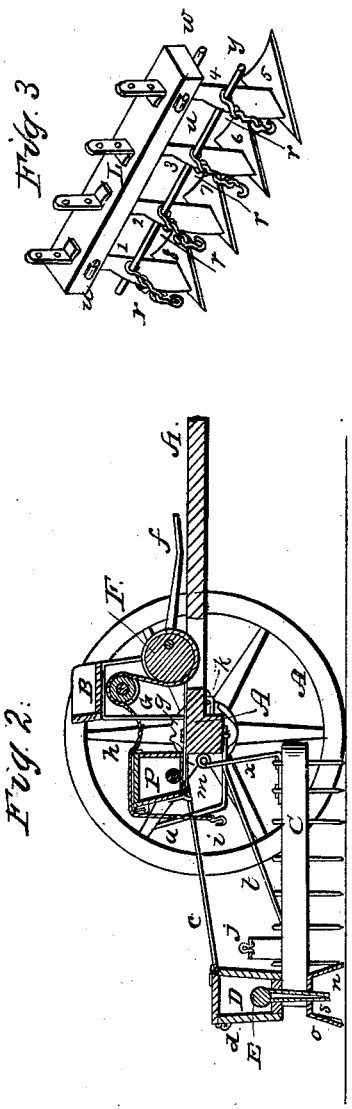
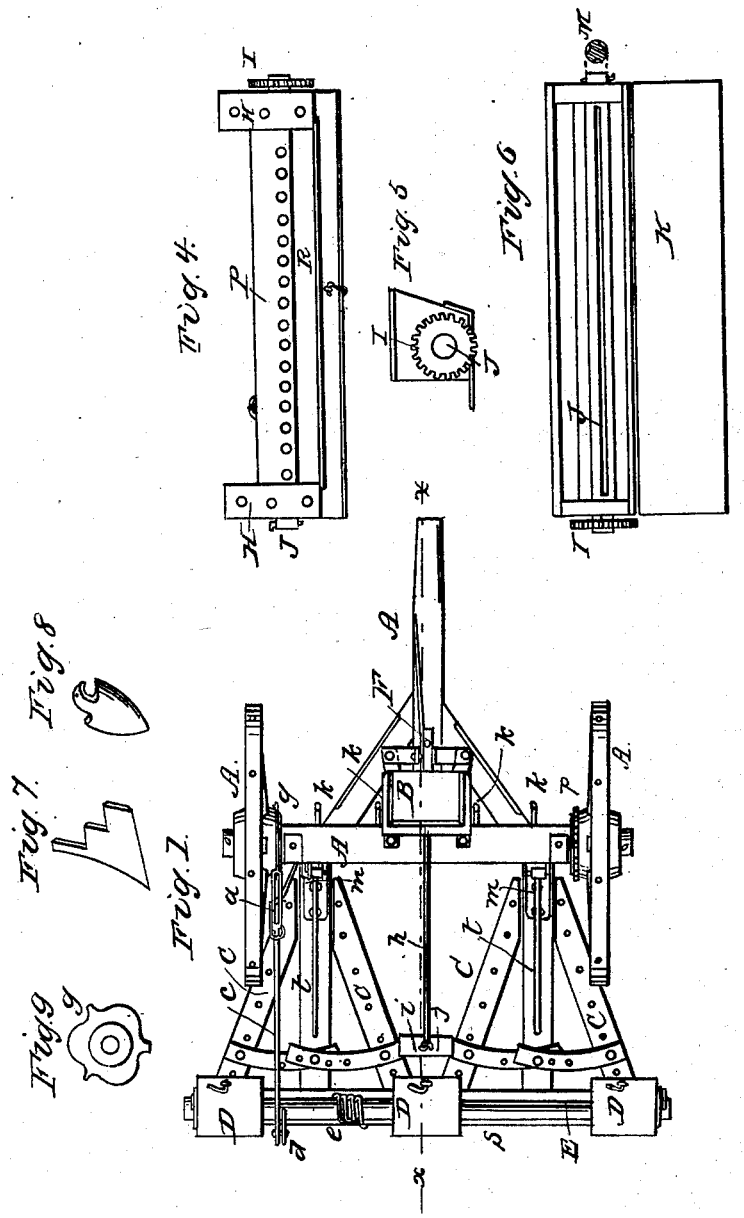

United States Patent Office.

EMERSON F. CRAWFORD, OF CANAAN, INDIANA.

Letters Patent No. 78,066, dated May 19, 1868.

IMPROVEMENT IN COMBINED SEEDER AND CULTIVATOR.

*The Schedule referred to in these Letters Patent and making part of the same.*

TO ALL WHOM IT MAY CONCERN:

Be it known that I, EMERSON F. CRAWFORD, of Canaan, in the county of Jefferson, and State of Indiana, have invented a new and useful Improvement in Combined Seeder and Cultivator; and I do hereby declare that the following is a full, clear, and exact description thereof, which will enable those skilled in the art to make and use the same, reference being had to the accompanying drawings, forming part of this specification.

The object of my invention is to so arrange, combine, and construct running and operative gear that the several machines, viz, harrow, corn-planter, young-corn plough, seed-drill, and meadow-cultivator may be operated successively, receiving their motion, and acting in combination with the same running-gear, thus rendering the above-named machines capable of being reduced to a minimum, both in bulk and price.

I will now proceed to describe the operation and construction of my invention.

Figure 1 is a plan of the running-gears with the harrow and corn-planter attached.

Figure 2 is a section through $x$ $x$, fig. 1, with the seed-drill also attached.

Figure 3 is a perspective view of the meadow-cultivator.

Figure 4 is a bottom plan of the seed-holder of the drill.

Figure 5 is an end view of the same.

Figure 6 is a top view of the same, with the lid thrown open, showing the interior.

Figure 7 is the rear share for the young-corn plough.

Figure 8 is the front share for the same.

Figure 9 is a side elevation of the cam used for operating the corn-planter.

Similar letters of reference indicate corresponding parts.

A indicates the different parts of the running-gears. B is the driver's seat. C is the harrow, which may be made adjustable, as shown. D D D are the hoppers or grain-holders for the corn-planter. E is a roller, passing through the hoppers D, having bearings in their sides, and mortises of sufficient size to hold the proper number of grains of corn for each hill, these mortises being such a distance from the ends that they will come within the area of the several hoppers. F is a cam, with a lever, $f$, attached. G is a sheave, attached to the under side of the seat B, around which passes the rope or cord $h$, to the end of which is fastened a hook, $i$; the other end is fastened to the lever $f$, and passes thence around the cam F, which is grooved to receive it.

The rod $z$ is bolted or screwed to the harrow at its lower end, and is stayed by the rod $t$. There are two of these rods $z$, at opposite ends of the axle, their upper ends being curved, so as to form a hinge when connected with the bent rods $m$ $m$.

$c$ is a rod, hinged at one end to the upright lever or arm $d$, and, passing through the supporting-link $a$, is slotted at the other end, to enable it to catch on the cam $g$, (elevation, fig. 9.) $e$ is a coil-spring, for rotating the roller E back to its normal position after it has been drawn forward by the bar $c$.

$s$ $s$ $s$ are tubes in the bottoms of the hoppers, for the purpose of conveying the corn to the ground. $n$ is a share, formed like fig. 8, for opening a furrow for the grain, and $o$ is a double share for covering it. These, $n$ and $o$, may both be made in one piece. S is a bar of wood, to which the hoppers are attached, and which also forms their bottoms. $k$ $k$ $k$ $k$ are hooks placed in the front side of the axle.

Fig. 3 shows the meadow-cultivator. L is a beam mortised to receive the coulters 1 2 3 4. To these are fastened the triangular-shaped cutters 5 6 7 8, which pass under the sod and loosen the roots. The upper ends of the cutters or coulters have holes in them, through which is passed the rod $w$, for the purpose of regulating the distance of the beam L from the ground. $u$ $u$ are loops, for fastening the cultivator to the axle. The rod $y$ is passed through the coulters lower down, and to this are fastened the chains $r$ $r$ $r$ $r$.

Figs. 4, 5, and 6 are different views of the seed-holder for the drill.

The bottom plan (fig. 4) shows the holes for the exit of the seeds, the amount passing out being regulated by the sliding plate R, which slides in grooves under the fastening-plates H H.

J, fig. 6, is a roller, having three or four flutes in it, of proper length and depth. On one end of this roller is a pinion, I, which, when the seed-holder is placed on the axle, will mesh with the spur-wheel $p$ on the wheel-hub, (fig. 1,) thus revolving the roller J, and distributing the seed properly.

Operation.

When it is desired to harrow, the bar S, with its appendages, is detached from the harrow, the loops on the rods $z\ z$ are slipped on the bent rods $m\ m$, and all is complete. When the harrow is to be lifted, the hook $i$, on the rope, is fastened to the loop $j$, when it may be raised by lifting the lever $f$.

When we wish to plant corn, the teeth of the harrow are removed, the three shares $n\ o$ are bolted on in their proper places, the bar S and its appendages are attached, the rod $c$ is hinged at $d$, as shown, and passed through the supporting-link $a$, and the slot in its end hooks over the projections on the cam $g$. The corn being placed in the hoppers D D D, all is ready for operation. The cam $g$ being attached to the hub of the wheel, when the wheel revolves forward, the hooks or projections on the cam operate to draw forward the rod $c$, thus revolving the roller E, so that the mortises containing the corn are brought opposite the tubes $s$, allowing the grains to drop out. At this point the slot in the rod $c$ is raised free of the projections on the cam by the smooth rounded parts, thus allowing the spring $e$ to revolve the roller E back to the first position.

In drilling, the harrow and corn-planter may remain, but the shares $n\ o$ and the rod $c$ must be removed, the teeth will be put in the harrow, and the seed-holder of the drill is bolted on. The operation of this has been described.

In ploughing young corn, all the corn-planting attachments, the seed-drill, and the harrow-teeth are removed. Four ploughshares, like fig. 7, will be required. These will be placed in the four rear ends of the diagonal beams of the harrow, the holes for the teeth serving for these also. If necessary, they may be held in place by a nut on the top. Two shares, like fig. 8, will be placed in the forward ends of the centre beams of the harrow. The harrow is adjusted to suit the width of the rows of corn, and all is ready for operation.

When using the meadow-cultivator, everything is removed from the running-gears, the thimbles $u\ u$ (fig. 3) are slipped over the bent rods or hooks $m\ m$, (figs. 1 and 2,) the chains $r\ r\ r\ r$ are brought forward under the axle, linked to the hooks $k\ k\ k\ k$, and all is complete.

Having thus described my invention, what I claim as new, and desire to secure by Letters Patent, is—

The construction and arrangement of the framework and operative gear of the machine, in such a manner that the different machines can be used together, or successively, substantially as and for the purposes specified.

EMERSON F. CRAWFORD.

Witnesses:
   JOHN H. WOODARD,
   H. C. WHITE.